United States Patent [19]

Gill et al.

[11] Patent Number: 5,073,836
[45] Date of Patent: Dec. 17, 1991

[54] SINGLE POLE WRITE AND A DIFFERENTIAL MAGNETO-RESISTIVE READ FOR PERPENDICULAR RECORDING

[75] Inventors: Hardayal S. Gill, Los Altos; Victor W. Hesterman, Los Altos Hills, both of Calif.

[73] Assignee: Hewlett-Packard Company, Palo Alto, Calif.

[21] Appl. No.: 417,374

[22] Filed: Oct. 5, 1989

[51] Int. Cl.$^5$ .............................................. G11B 5/39
[52] U.S. Cl. ..................................... 360/113; 360/125
[58] Field of Search ................................. 360/113, 125

[56] References Cited

U.S. PATENT DOCUMENTS

| | | | |
|---|---|---|---|
| 3,975,772 | 8/1976 | Lin | 360/113 |
| 4,649,449 | 3/1987 | Sawada et al. | 360/123 |
| 4,725,909 | 2/1988 | Kawai | 360/126 |
| 4,807,076 | 2/1989 | Nakashima et al. | 360/126 |
| 4,881,143 | 11/1989 | Bhattacharyya et al. | 360/113 |

FOREIGN PATENT DOCUMENTS 0325365  7/1989  European Pat. Off. ............ 360/113

OTHER PUBLICATIONS

H. S. Gill et al., Journal of Applied Physics, vol. 65, No. 1, p. 402, Jan. 1989.

*Primary Examiner*—John H. Wolff

[57] ABSTRACT

A head structure for reading and writing perpendicular transitions from and to a moving recording medium. The head structure comprises an auxiliary magnetic pole having a tapered edge adjacent its air bearing surface that is oriented transverse to the direction of motion of a recording medium. A magnetoresistive gradiometer employed as the read mechanism is formed within a layer of insulating material disposed on the auxiliary pole member. The gradiometer comprises two magnetoresistive members separated by dielectric material, and two shield members disposed on opposite sides of the magnetoresistive members. The shield members shield the magnetoresistive members from undesired magnetic fields and thus improve the resolution of the signals read from the medium. A coil is formed on and encapsulated within a layer of photoresist material deposited above the layer of insulating material. A primary magnetic pole is disposed on the layer of photoresist material and has a portion thereof which tapers toward the air bearing surface. The primary and auxiliary magnetic poles are adapted to write to the recording medium. A portion of the primary magnetic pole is spaced away from the auxiliary pole member at a location substantially opposite the location of the gradiometer, in order to minimize data erasure in the recording medium by increasing the reluctance of the head strcuture. This gap minimizes data erasure in the recording medium due to stray magnetic fields by enhancing the reluctance of the head structure. A layer of nonmagnetic insulating material is disposed on the primary magnetic pole to encapsulate it and complete the head structure. The geometry of the head structure minimizes its sensitivity to externally applied fields. The magnetoresistive gradiometer is positioned in the gap of the write head so that it experiences minimum fields caused by write coil excitation. Furthermore, the geometry of the gradiometer head shields results in better linear resolution than conventional head designs without shields.

19 Claims, 1 Drawing Sheet

SINGLE POLE WRITE AND A DIFFERENTIAL MAGNETO-RESISTIVE READ FOR PERPENDICULAR RECORDING

BACKGROUND

The present invention relates generally to perpendicular recording heads and methods of making same, and more particularly to a perpendicular recording head which minimizes the sensitivity of the head to external applied fields, and which incorporates a magnetoresistive gradiometer for detecting the perpendicular transitions.

Conventional perpendicular recording heads are disclosed in U.S. Pat. No. 4,649,449 entitled "Perpendicular Magnetic Head," issued to Sawada et al., U.S. Pat. No. 4,725,909 entitled "Vertical Magnetic Head Comprising Means for Converging Magnetic Flux to Enable High Density Recording," issued to Kawai, and U.S. Pat. No. 4,807,076 entitled "Thin Film Magnetic Head for Use in Vertical Magnetic Recording" issued to Nakashima et al.

In recording systems that employ perpendicular recording concepts, the orientation of residual magnetization in the recording medium is substantially perpendicular to the surface of the medium. Such perpendicular recording systems have the potential for providing higher recording density than comparable longitudinal recording systems. However, conventional single pole perpendicular recording head designs cause erasure of data recorded in the medium as a result of stray magnetic fields that magnetize the permeable underlayer. The magnetic flux from the underlayer fringes up into the main pole tip and back into the underlayer through the auxiliary pole tip, thus producing a concentrated high field region in the medium just under the narrow thin main pole tip. This high field can cause data erasure or degradation in the recorded data. Also magnetic fields perpendicular to the recording medium can collect on the head and then be concentrated between the main pole tip and the permeable underlayer. Also data erasure at the corners of the recording head is caused by flux in the underlayer that fringes up into one corner of the auxiliary pole and back into the underlayer through another corner. Thus a high field concentration is created under these corners.

The Sawada et al. patent dicusses the disc data erasure problem at column 6, lines 61–66, and a solution to this problem at column 18, line line 46, to column 20, line 63, which describes FIGS. 24–27. In particular, the description with reference to FIGS. 24–27 indicates that two auxiliary poles of the recording head are designed such that one pole is tapered and the other pole has rounded edges. The orientation of the recording head is such that the tapers and rounding of the poles are along the direction of motion of the recording medium. The Nakashima patent discloses a recording head comprising main and auxiliary magnetic poles, and wherein the auxiliary magnetic pole is recessed away from the edge of the main pole by a distance of from 1–5 microns. The Kawai patent discloses a head design wherein two auxiliary poles are placed on the sides of the main pole, transverse to the direction of motion of the recording medium. This design is adapted to minimize external noise related to the storage field effect in the recording medium (see column 4, lines 31–38).

Although a variety of recording heads have been developed, heretofore, no recording head has been developed that minimizes the sensitivity of the head to externally applied fields, and that incorporates a magnetoresistive gradiometer for detecting the perpendicular transitions that experiences minimum fields caused by write coil excitation.

SUMMARY OF THE INVENTION

Accordingly, there is provided a head structure for reading and writing perpendicular transitions from and to a moving recording medium. The head structure is comprised of a magnetoresistive gradiometer read head positioned between the main pole and the auxiliary pole of the write head. In addition, the auxiliary magnetic pole has a predetermined taper adjacent the air bearing surface of the head structure extending from about its center to its lateral edges. The taper is oriented transverse to the direction of motion of a recording medium, and is adapted to prevent inadvertent disc data erasure at the corners of the auxiliary pole.

The gradiometer comprises first and second magnetoresistive members separated by dielectric, and first and second shields disposed on opposite sides of the magnetoresistive members. The shields are adapted to shield the magnetoresistive members from undesired magnetic fields created by a write coil and to improve the resolution of the signal read from the recorded track. The write coil is formed on and encapsulated in a layer of photoresist deposited on the layer of dielectric.

A primary magnetic pole is disposed on the layer of photoresist and has a portion thereof which tapers toward an air bearing surface. The primary and auxiliary magnetic poles are adapted to write to the moving recording medium. A layer of nonmagnetic insulating material is disposed on the primary magnetic pole to encapsulate it and complete the head structure. The edge of the auxiliary pole adjacent the air bearing surface is typically recessed a slight distance relative to the tip thereof. A portion of the primary magnetic pole is spaced away from the auxiliary pole at a location substantially opposite the location of the gradiometer. This gap minimizes data erasure in the recording medium by increasing the reluctance of the head structure. The geometry of the head structure of the present invention minimizes its sensitivity to externally applied fields. The magnetoresistive gradiometer is positioned in the gap of the write head, which comprises the two magnetic poles, so that it experiences minimum y-axis fields caused by write coil excitation. Furthermore, the geometry of the shields of the gradiometer results in better linear resolution compared to conventional head designs without shields.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
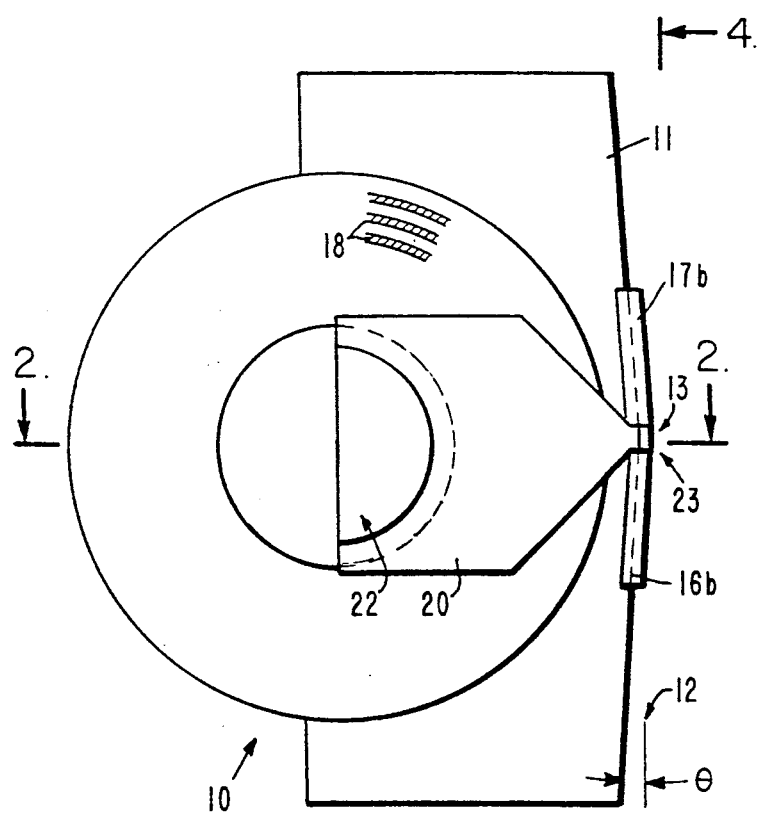
FIG. 1 illustrates a planar view of a magnetoresistive recording head structure in accordance with the principles of the present invention.

FIG. 1 shows a planar view of a head structure 10 in accordance with the principles of the present invention. The head structure 10 is comprised of auxiliary and main magnetic pole members 11, 20 which are comprised of a magnetizable material such as permalloy, for example. One edge of the auxiliary pole member 11 disposed adjacent to an air bearing surface 13 of the head structure 10 is tapered, which taper 12 is identified by the angle $\theta$. The taper 12 starts approximately one half track width from the center of the auxiliary pole member 11 and extends to the opposed lateral edges thereof. Typically, the taper 12 is on the order of about 2-6 degrees, which correlates to a distance of from 5-16 microns at the outer edges of the auxiliary pole member 11. The taper 12 is oriented transverse to the direction of motion of the recording medium and is adapted to prevent inadvertent data erasure at the corners of the auxiliary pole member 11. The primary pole member 20 is tapered adjacent the air bearing surface 13 and has a back gap 22 at its rear end opposite the air bearing surface 13. A magnetoresistive gradiometer 23 is located adjacent the air bearing surface 13 of the head structure 10. The lateral extent of the components of the magnetoresistive gradiometer 23, comprising shields 16 and magnetoresistive members 17 are shown.

Figure 2:
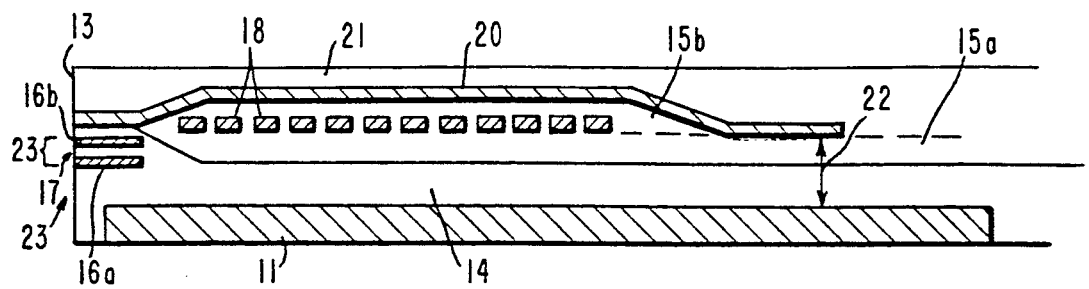
FIG. 2 illustrate a cutaway side view of the magnetoresistive recording head structure of FIG. 1 taken in the direction of the arrows 2—2 of FIG. 1.

Referring to FIG. 2, a cross sectional view of the present invention shown in FIG. 1, taken in the direction of the arrows 2—2, and switched end-to-end with respect to FIG. 1. The head structure 10 is comprised of the auxiliary magnetic pole member 11 which forms a substrate for the head structure 10. The auxiliary magnetic pole member 11 is comprised of a magnetizable material such as permalloy, for example. A layer of insulating material 14, or dielectric material, such as aluminum oxide, or the like, is deposited onto the surface of the auxiliary magnetic pole member 11. This layer of insulating material 14 is back lapped to form a planarized surface layer onto which is formed a magnetoresistive gradiometer 23. The magnetoresistive gradiometer 23 is located adjacent the air bearing surface 13 of the head structure 10.

Figure 3:
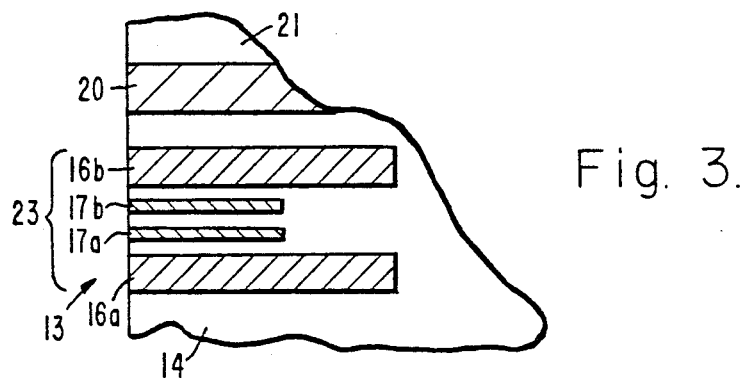
FIG. 3 is an enlarged view of a magnetoresistive gradiometer employed in the magnetoresistive recording head structure of FIG. 1.

With reference to FIG. 3, an enlarged view of the magnetoresistive gradiometer 23 is shown in more detail. The magnetoresistive gradiometer 23 is comprised of a first magnetic shield member 16a formed on the surface of the back lapped layer of insulating material 14. Additional insulating material is deposited on top of the first magnetic shield member 16a, and then a first magnetoresistive member 17a is formed on this additional insulating material. Insulating material is then deposited on the first magnetoresistive member 17a and insulating material is then deposited thereon. A second magnetoresistive member 17b is formed on top of the previously deposited insulating material. Then the second magnetic shield 16b is deposited to form the completed magnetoresistive gradiometer 23. Subsequent to the formation of the magnetoresistive gradiometer 23, additional insulating material 14 is deposited to encapsulate the magnetoresistive gradiometer 23.

Referring again to FIG. 2, a layer of photoresist 15a is then deposited on top of the layer of insulating material 14, and a coil structure 18 is deposited thereon. A second layer of photoresist 15b is then deposited over the coil structure 18 to encapsulate it. A primary magnetic pole member 20 is then formed on top of the encapsulated coil structure 18. The primary magnetic pole member 20 is comprised of a magnetizable material such as permalloy, for example. The coil structure 18 is typically formed using a metal such as copper, gold or aluminum-copper, for example, and the coil windings are typically about 3 microns wide and 2 microns high, and having a spacing between windings of about 2 microns. The primary magnetic pole member 20 has a back gap 22 formed relative to the auxiliary pole member 11 at a position opposite the location of the magnetoresistive gradiometer 23, or the air bearing surface 13, in that the primary pole member 20 is spaced away from the auxiliary pole member 11 as is shown at the right hand side of FIG. 2.

Referring again to FIG. 3, the relative spacings and encapsulation of the various components of the gradiometer 23 are shown as was described with reference to FIGS. 1 and 2, and disclosed in the above-cited patent and article. Reference is made to an article entitled "A magnetoresistive gradiometer for detection of perpendicularly recorded magnetic transitions," authored by H. S. Gill et al., published in *Journal of Applied Physics*, Volume 65, No. 1, January 1989, which describes the sensing portion of the magnetoresistive gradiometer 23 in detail.

Figure 4:
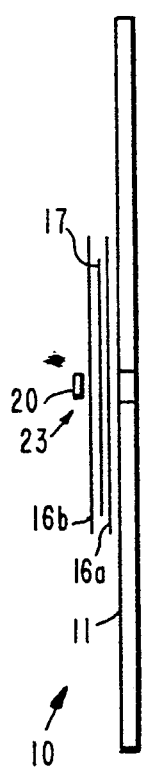
FIG. 4 illustrates an end view of the magnetoresistive recording head structure of FIG. 1 taken in the direction of arrows 4—4.

With reference to FIG. 4, it illustrates an end view of the magnetoresistive recording head structure 10 taken in the direction of arrows 4—4 in FIG. 1. This end view of the head structure 10 illustrates the relative spacings of the auxiliary pole member 11, the major components of the magnetoresistive gradiometer 23 and the primary pole member 20. However, the spacings are shown increased in scale compared to the planar dimensions shown in FIG. 1.

Thus, new and useful magnetoresistive recording head structures have been described that provide for recording and reproduction of perpendicular transitions in recording media. It is to be understood that the above-described embodiments of the invention are merely illustrative of some of the many possible specific embodiments which represent applications of the principles of the present invention. Clearly, numerous and varied other arrangements can be readily devised in accordance with these principles by those skilled in the art without departing from the scope of the invention.

What is claimed is:

1. A head structure for reading and writing perpendicular transitions from and to a moving recording medium, said structure comprising:
   an auxiliary magnetic pole member;
   a planarized first layer of nonmagnetic insulating material disposed on the auxiliary pole member;
   a magnetoresistive gradiometer adapted to read from the moving recording medium and formed on the planarized first layer of insulating material adjacent one edge of the auxiliary magnetic pole member comprising an air bearing surface;
   a second layer of nonmagnetic insulating material disposed on the first layer of insulating material and on the gradiometer to encapsulate the gradiometer;
   a layer of photoresist material disposed on the second layer of insulating material; and a coil encapsulated in the layer of photoresist material;

a primary magnetic pole member disposed on the layer of photoresist material and having a portion thereof tapering toward one edge thereof adjacent the air bearing surface, the primary and auxiliary magnetic pole members being adapted to write to the moving recording medium.

2. The structure of claim 1 wherein the gradiometer comprises first and second magnetoresistive members separated by dielectric material, and first and second shield members disposed on opposite sides of the magnetoresistive members such that one shield member is disposed between the magnetoresistive members and the auxiliary pole member and the other shield member is disposed between the magnetoresistive members and the main pole member, the shield members being adapted to magnetically shield the magnetoresistive members from undesired magnetic fields, and to provide improved resolution of the signal from the data.

3. The structure of claim 2 wherein the auxiliary magnetic pole member has a taper starting approximately one half track width from the center of one edge thereof adjacent to an air bearing surface of the head structure, which taper is adapted to be oriented transverse to the direction of motion of the recording medium and is adapted to prevent inadvertent data erasure at the corners of the auxiliary pole member.

4. The structure of claim 2 wherein a portion of the primary magnetic pole member located substantially opposite the location of the gradiometer is spaced away from the auxiliary pole member, in order to minimize data erasure in the recording medium by increasing the reluctance of the head structure.

5. The structure of claim 1 wherein the auxiliary magnetic pole member has a taper starting approximately one half track width from the center of one edge thereof adjacent to an air bearing surface of the head structure, which taper is adapted to be oriented transverse to the direction of motion of the recording medium and is adapted to prevent inadvertent data erasure at the corners of the auxiliary pole member.

6. The structure of claim 1 wherein a portion of the primary magnetic pole member located substantially opposite the location of the gradiometer is spaced away from the auxiliary pole member, in order to minimize data erasure in the recording medium by increasing the reluctance of the head structure.

7. A head structure for reading and writing perpendicular transitions from and to a moving recording medium, said structure comprising:

an auxiliary magnetic pole member;

a planarized first layer of nonmagnetic insulating material disposed on the auxiliary pole member;

a magnetoresistive gradiometer adapted to read from the moving recording medium and formed on the planarized first layer of insulating material, which gradiometer comprises first and second magnetoresistive members separated by dielectric material, and first and second shield members disposed on opposite sides of the magnetoresistive members such that one shield member is disposed between the magnetoresistive members and the auxiliary pole member and the other shield member is disposed between the magnetoresistive members and the main pole member, the shield members being adapted to magnetically shield the magnetoresistive members from undesired magnetic fields, and to provide improved resolution of the signal from the data;

a second layer of nonmagnetic insulating material disposed on the first layer of insulating material and on the gradiometer to encapsulate the gradiometer;

a layer of photoresist material disposed on the second layer of insulating material;

a coil encapsulated in the layer of photoresist material; and a primary magnetic pole member disposed on the layer of photoresist material and having a portion thereof tapering toward the end adjacent the air bearing surface, the primary magnetic pole member, in conjunction with the auxiliary pole member, being adapted to write to the moving recording medium.

8. The structure of claim 7 wherein the auxiliary magnetic pole member has a taper starting approximately one half track width from the center of one edge thereof adjacent to an air bearing surface of the head structure, which taper is adapted to be oriented transverse to the direction of motion of the recording medium and is adapted to prevent inadvertent data erasure at the corners of the auxiliary pole member.

9. The structure of claim 7 further comprising a third layer of nonmagnetic insulating material disposed on the primary magnetic pole member to encapsulate it.

10. The structure of claim 7 wherein the edge of the auxiliary pole member adjacent the air bearing surface is recessed a predetermined distance therefrom.

11. The structure of claim 10 wherein a portion of the primary magnetic pole member located substantially opposite the location of the gradiometer is spaced away from the auxiliary pole member, in order to minimize data erasure in the recording medium by increasing the reluctance of the head structure.

12. The structure of claim 11 wherein the gradiometer is disposed between the primary and auxiliary magnetic pole members adjacent to the air bearing surface of the head structure.

13. The structure of claim 7 wherein a portion of the primary magnetic pole member located substantially opposite the location of the gradiometer is spaced away from the auxiliary pole member, in order to minimize data erasure in the recording medium by increasing the reluctance of the head structure.

14. The structure of claim 11 wherein the gradiometer is disposed between the primary and auxiliary magnetic pole members adjacent to the air bearing surface of the head structure.

15. The structure of claim 7 wherein the gradiometer is disposed between the primary and auxiliary magnetic pole members adjacent to the air bearing surface of the head structure.

16. A head structure for reading and writing perpendicular transitions from and to a moving recording medium, said structure comprising:

an auxiliary magnetic pole member having a taper starting approximately one half track width from the center of one edge thereof adjacent to an air bearing surface of the head structure, which taper is adapted to be oriented transverse to the direction of motion of the recording medium and is adapted to prevent inadvertent data erasure at the corners of the auxiliary pole member;

a planarized first layer of nonmagnetic insulating material disposed on the auxiliary pole member;

a magnetoresistive gradiometer disposed adjacent to the air bearing surface of the head structure adapted to read from the moving recording medium and formed on the planarized first layer of insulating material, and comprises first and second magnetoresistive members separated by dielectric material, and first and second shield members disposed on opposite sides of the magnetoresistive members such that one shield member is disposed between the magnetoresistive members and the auxiliary pole member and the other shield member is disposed between the magnetoresistive members and the main pole member, the shield members being adapted to magnetically shield the magnetoresistive members from undesired magnetic fields, and to provide improved resolution of the signal from the data;

a second layer of nonmagnetic insulating material disposed on the first layer of insulating material and on the gradiometer to encapsulate the gradiometer;

a layer of photoresist material disposed on the second layer of insulating material;

a coil encapsulated in the layer of photoresist material;

a primary magnetic pole member disposed on the layer of photoresist material and having a portion thereof tapering toward the end adjacent the air bearing surface, the primary magnetic pole member, in conjunction with the auxiliary pole member, being adapted to write to the moving recording medium; and a third layer of nonmagnetic insulating material disposed on the primary magnetic pole member to encapsulate it.

17. The structure of claim 16 wherein the edge of the auxiliary pole member adjacent the air bearing surface is recessed a predetermined distance therefrom.

18. The structure of claim 17 wherein a portion of the primary magnetic pole member located substantially opposite the location of the gradiometer is spaced away from the auxiliary pole member, in order to minimize data erasure in the recording medium by increasing the reluctance of the head structure.

19. The structure of claim 16 wherein a portion of the primary magnetic pole member located substantially opposite the location of the gradiometer is spaced away from the auxiliary pole member, in order to minimize data erasure in the recording medium by increasing the reluctance of the head structure.

* * * * *